Nov. 26, 1946.    R. P. BEATTIE ET AL    2,411,704
PHOTOGRAPHIC CAMERA
Filed March 12, 1943    3 Sheets-Sheet 1
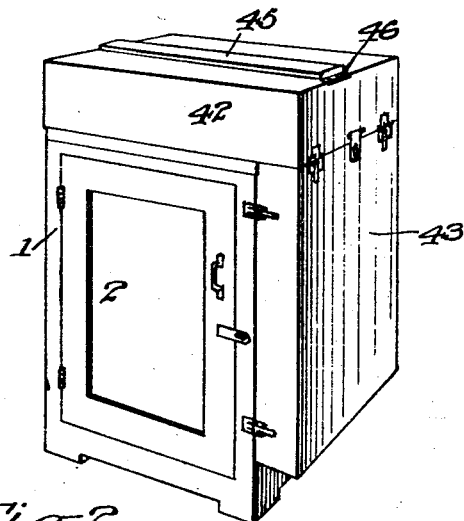
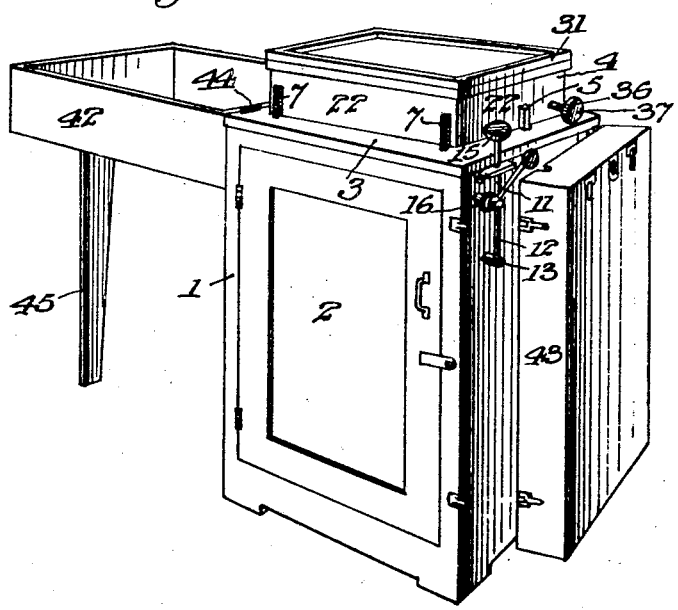
INVENTORS
Roland P. Beattie
Kenneth W. Beattie
Kenneth B. Beattie
Roland P. Beattie II
By Brown & Seward
Attorneys

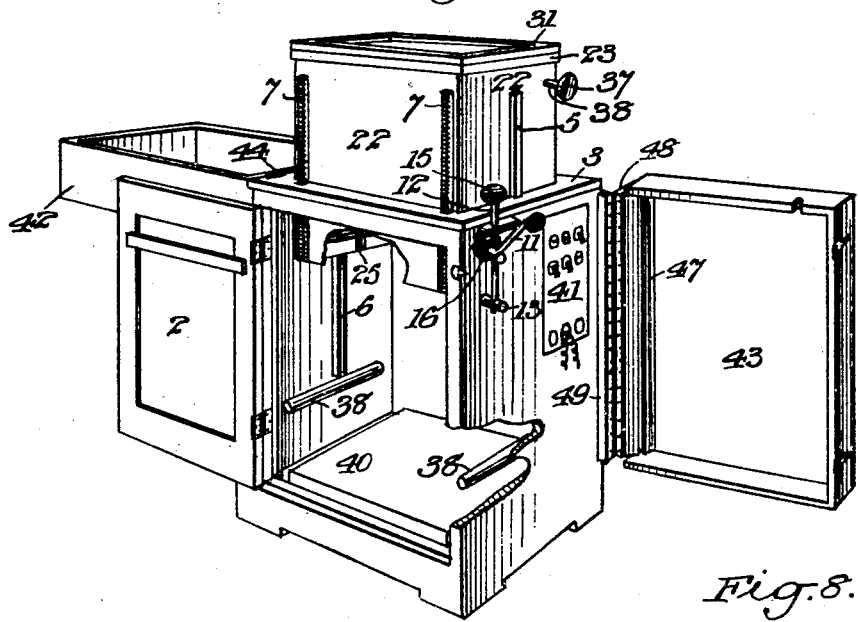
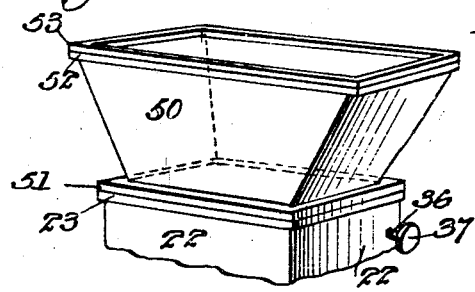
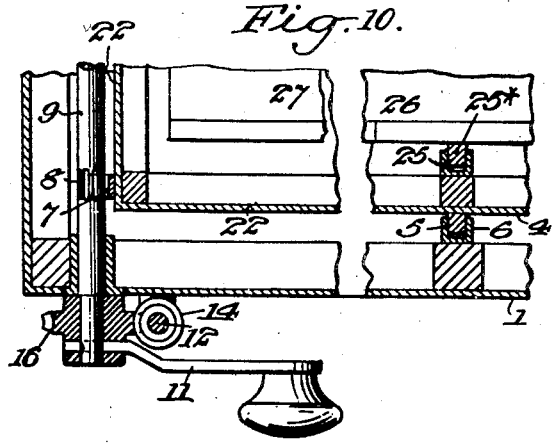

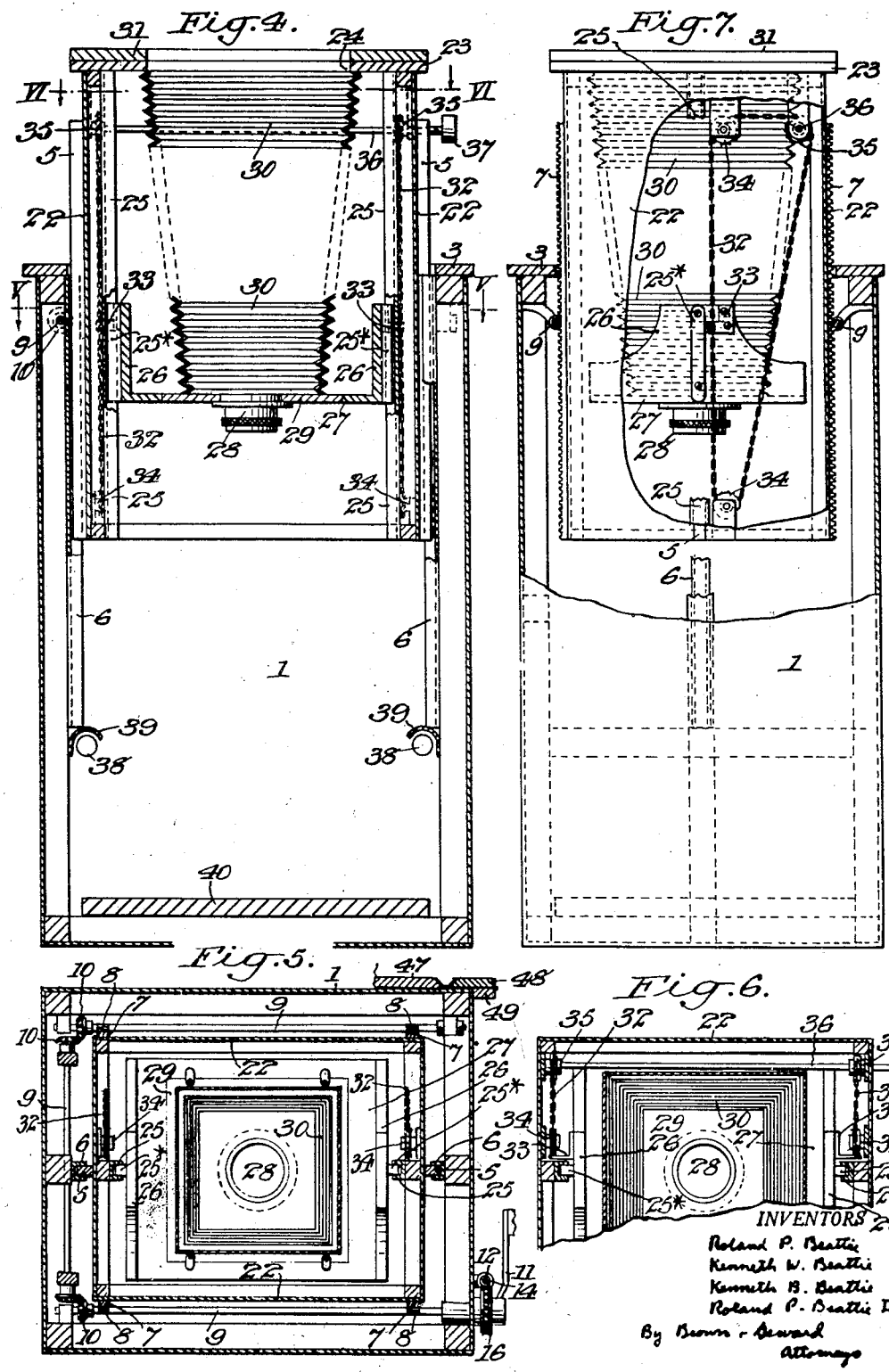

Patented Nov. 26, 1946

2,411,704

UNITED STATES PATENT OFFICE 2,411,704

PHOTOGRAPHIC CAMERA

Roland P. Beattie, Kenneth W. Beattie, Kenneth B. Beattie, and Roland P. Beattie, II, Summit, N. J.

Application March 12, 1943, Serial No. 478,858

1 Claim. (Cl. 88—24)

This invention relates to a photographic camera and particularly a process camera adapted for copying and making line, screen and continuous tone negatives, enlargements or reductions from copy suitable for such reproduction.

An object of the invention is to provide in convenient, unitary, portable form a complete copying camera which may be set up and prepared for use in a minimum of time and in any location, as, for instance, at an army field headquarters or other post.

A further object is to provide the camera with a housing such that it may be closed and packed for transportation without danger of damage to the working parts and without the need for dismantling the camera so as to require re-assembly for further use.

Another object is to provide an inside telescopic unit comprising the camera proper, which unit is movable with respect to the housing for regulating the degree of enlargement or reduction (if any) of copy mounted in said housing; said unit also being removable from the housing for use as a view camera or for reproducing large copy.

A still further object is to provide such a camera of simple construction but having all the refinements of detail necessary to secure optimum results.

Another object is to provide certain improvements in the form, construction and arrangement of the several parts whereby the above and other objects may effectively be attained.

A practical embodiment of the invention is shown in the accompanying drawings, in which Fig. 1 represents a perspective view of the camera and its housing in closed position;

Fig. 2 represents a perspective view of the camera and its housing partly opened;

Fig. 3 represents a perspective view of the camera and its housing opened and ready for use, parts being broken away;

Fig. 4 represents a vertical longitudinal section through the main camera and housing units;

Fig. 5 represents a horizontal section taken along the line V—V of Fig. 4 looking in the direction of the arrows;

Fig. 6 represents a detail horizontal section taken along the line VI—VI of Fig. 4;

Fig. 7 represents an end elevation of the main camera and housing units, parts being broken away to show certain interior construction;

Fig. 8 represents a detail elevation of the camera elevating and lowering mechanism;

Fig. 9 represents a horizontal section taken along the line IX—IX of Fig. 8, looking in the direction of the arrows;

Fig. 10 represents a horizontal section taken along the line X—X of Fig. 8, looking in the direction of the arrows, and Fig. 11 represents a detail perspective view of a reducing and enlarging cone, in enlarging position on the top of the camera.

Referring to the drawings, a main camera housing 1 is provided, having three closed sides and a front opening door 2 in its fourth side. The top of the housing comprises a rectangular frame 3 fitting closely around the four sides of an inner telescopic unit 4 which is adapted to move vertically in and out of the housing, being guided in such movement by the strips 5 sliding in guide-ways 6.

The unit 4 is mechanically raised and lowered by a rack and gear drive including the racks 7, which may be disposed adjacent each of the four corners of the unit, the small gears 8, shown as being formed directly in the shafts 9, the bevel gears 10, and the crank 11 located at a convenient point on the outside of the housing. The shafts 9 are journaled in suitable supports on the housing and the arrangement is such that power is transmitted to a plurality of points around the inner unit, to avoid binding of the unit against parts of the housing; although in some cases it may be found that driving at a single point or less than four points gives satisfactory results.

In addition to the hand crank 11 it is also desirable to provide a vernier adjustment of the camera back unit (for microfocusing), shown in detail in Figs. 8, 9 and 10, comprising a shaft 12, journaled for rotation and rocking motion in a bearing 13, and having a worm 14 keyed to the shaft and a handle 15 at the upper end of the shaft. The worm 14 engages with a worm wheel 16 on the shaft 9 adjacent to the crank 11 when the shaft 12 is in its vertical position, but may be disengaged by rocking said shaft 12 to the position shown in broken lines in Fig. 8, when operation by means of the crank 11 is desired. The shaft 12 passes through a slot 17 in a bracket 18 secured to the side of the housing and is urged toward worm-engaging position by the action of a compression spring 19 having one end secured to the bracket and the other end secured to a collar 20 fitted loosely about the shaft. A finger-operated spring lock 21 is also associated with the shaft 12 and is arranged to snap over one end of the bracket for holding the shaft positively in worm-engaging position when the vernier drive is to be used, or when it is desired to lock the raising and lowering mechanism, the worm-and-wheel drive being irreversible. When it is desired to operate the crank 11 for fast driving, the lock 21 is released and the shaft 12 rocked to compress the spring 19 and to disengage the worm 14 from the wheel 16.

The inner telescopic unit 4 includes a suitable rectangular framework, four side walls 22 and a top board 23 provided with a rectangular opening 24. The guide strips 5 are secured to the outside of two opposite side walls, and vertical grooved guide-ways 25 are secured to the inside of opposite side walls for guiding, by engagement with the short tongues 25*, the ends 26 of a horizontally disposed lens elevator 27. The camera lens 28 is mounted in the lens board 29 (removably secured in the elevator) and a bellows 30 extends from the lens board to the top board 23, as clearly shown in Figs. 4 and 7. The top board is adapted to receive and support a plate or film holder with or without a ground glass focusing plate, all indicated generally at 31.

Raising and lowering of the lens elevator 27 in the unit 4 (for lens focusing) is effected by means of the chains 32, fastened to the elevator ends 26 by brackets 33, and running over idle sprockets 34 and driving sprockets 35; the latter being mounted on a shaft 36 which projects out of one side of the unit and is provided with a handle or knob 37. The sprockets 34 and 35 are all mounted on suitable supports attached to the side walls or frame of the unit 4.

The housing 1 is provided with lamps 38, preferably of fluorescent type, shielded by the curved reflecting shields 39, for illuminating copy which may be placed on the removable copy board 40 adjacent the bottom of the housing. An electric control panel 41 is mounted in one side of the housing at a convenient point, the control panel including an input socket, a switch for the lamps 38, and sockets and switches for the connection and control of such auxiliary electrical appliances as may be required.

Means for completing the closure of the housing include the combination top cover and work table 42 and the combination end door and carrying compartment 43; the cover-table 42 being hinged to the top frame 3 by hinges 44 (which may be of the loose pin type, for complete removal of the cover-table) and being provided with a foldable leg 45, hinged at 46. The door 43 has one of its end walls divided vertically into a fixed portion 47 and a hinged portion 48, the latter portion being in turn hinged at 49 to a corner of the housing 1; this arrangement being such that the door may be closed against the housing to cover and protect the vernier mechanism and control panel, or may be opened (270°) to lie with its back flat against the back of the housing. The cover-table 42 is of a depth sufficient to enclose the top of the inner unit 4 when the latter is in its lowest position as shown in Fig. 2, and is of a length such that it will extend over the top of the door 43, as shown in Fig. 1. The door 43 is made deep enough not only to accommodate the projecting parts of the vernier and control panel but also to provide storage and carrying space for such other equipment as plates, films, plate or film holders, etc.; and means are provided for securely locking the door to the main housing and the cover-table to the door (Fig. 1).

For certain purposes it may be desirable to provide an image area larger or farther from the lens than the opening 24 in the top board 23 of the camera unit; means for effecting this result is shown in Fig. 11 as comprising a four-sided funnel 50, having a base 51 adapted to fit on the top board 23, and an enlarged open top 52 adapted to receive a plate or film holder or a ground glass focusing plate indicated generally at 53.

The operation of the camera just described will be obvious, for the most part. Briefly, the device may be set up for operation by opening the cover-table 42 and end door 43 and plugging an electric connection into the input socket. Copy to be reproduced may then be placed on the copy board 40, suitably illuminated by the lamps 38, and necessary adjustments made of the inner telescopic unit 4 (by means of the crank 11 and vernier mechanism) and lens board 29 (by means of the handle 37) to ensure the proper focus and desired degree of enlargement or reduction, if any; the exposure being made by opening a shutter associated with the lens 28, or in any other customary or suitable manner. Special lenses for various requirements may be inserted, so that copy of a wide range of sizes, from microfilm up, can be handled.

As will be apparent from Figs. 3 to 7, the inner telescopic unit 4 is retained in the housing only by the engagement of the racks 7 with the gears 8; it is thus possible to remove the inner unit from the housing so that it may be used in any position or location as a view camera, or may be set up to photograph copy which is too large to fit on the copy board 40 in the housing.

It will be understood that various changes may be made in the construction, form and arrangement of the several parts without departing from the scope of our invention and hence we do not intend to be limited to the particular embodiment herein shown and described, but what we claim is:

A photographic camera of the character described comprising, a housing, an inner telescopic unit fitted in the top of said housing and projecting therefrom, means for adjusting said unit inwardly and outwardly through the top of the housing, said inner unit containing the photographic elements of the camera proper, and means associated with the housing for enclosing and protecting the projecting part of said inner unit, said last named means including a recessed door hinged vertically to the housing, and a recessed element hinged horizontally to the housing, said door being adapted to constitute a storage compartment and to close over exposed parts of the means for adjusting the inner unit, and said element being adapted, in its closed position, to cover both the top of said housing and the top of said door and, in its open position, to constitute a recessed work table.

ROLAND P. BEATTIE.
KENNETH W. BEATTIE.
KENNETH B. BEATTIE.
ROLAND P. BEATTIE, II.